United States Patent
Chen et al.

(10) Patent No.: US 8,334,720 B2
(45) Date of Patent: Dec. 18, 2012

(54) ELECTRONIC APPARATUSES AND ELECTRONIC SYSTEMS USING THE SAME FOR PROVIDING SUPPLY VOLTAGE TO EXTERNAL DEVICES

(75) Inventors: Yi An Chen, Taoyuan Hsien (TW); Rong Haw Chen, Taoyuan Hsien (TW); Sheng Fu Cheng, Taoyuan Hsien (TW); Chen Hung Huang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 114 days.

(21) Appl. No.: 12/954,029

(22) Filed: Nov. 24, 2010

(65) Prior Publication Data
US 2011/0267135 A1 Nov. 3, 2011

(30) Foreign Application Priority Data
May 3, 2010 (TW) .................... 99114040 A

(51) Int. Cl.
*H03K 3/01* (2006.01)

(52) U.S. Cl. ........................... 327/534; 327/530
(58) Field of Classification Search ............... 327/50, 327/97, 407, 530, 534, 535
See application file for complete search history.

(56) References Cited

U.S. PATENT DOCUMENTS

| | | | | |
|---|---|---|---|---|
| 6,062,480 | A * | 5/2000 | Evoy .............................. | 235/492 |
| 6,868,468 | B2 * | 3/2005 | Boz et al. ....................... | 710/304 |
| 7,296,107 | B2 * | 11/2007 | Lunsford et al. ............... | 710/304 |

* cited by examiner

*Primary Examiner* — Jeffrey Zweizig
(74) *Attorney, Agent, or Firm* — Muncy, Geissler, Olds & Lowe, PLLC

(57) ABSTRACT

An electronic apparatus for providing supply voltage to a first external device with a predetermined pin assignment specification is provided. The electronic apparatus includes a connection interface and a voltage supplier. The connection interface includes a first pin and a second pin. The voltage supplier provides a detection voltage signal to the first pin and determines whether to provide the supply voltage according to whether the second pin is at a first level in response to the detection voltage signal. When the second pin is at the first level in response to the detection voltage signal, the voltage supplier provides the supply voltage to the first pin.

22 Claims, 5 Drawing Sheets

US 8,334,720 B2

ELECTRONIC APPARATUSES AND ELECTRONIC SYSTEMS USING THE SAME FOR PROVIDING SUPPLY VOLTAGE TO EXTERNAL DEVICES

CROSS REFERENCE TO RELATED APPLICATIONS

This application claims the benefit of Taiwan application Serial No. 99114040 filed May 3, 2010, the subject matter of which is incorporated herein by reference.

BACKGROUND OF THE INVENTION

1. Field of the Invention

The invention relates to an electronic apparatus for providing supply voltage to an external device with a predetermined pin assignment specification to operate when the external device is inserted into or connected to the electronic apparatus.

2. Description of the Related Art

Generally, a main apparatus can be externally connected to portable peripheral devices to perform other applications or receive/transmit signals. For example, a projector can be externally connected to a portable adapter to receive video signals. However, the peripheral devices usually require additional supply voltage to operate, so that an additional voltage adapter is required to be connected to the peripheral devices for providing supply voltage, decreasing the convenience of portability of the peripheral devices for users.

Thus, an electronic apparatus is desired to provide supply voltage to an external device to operate when the external device is inserted into or connected to the electronic apparatus.

BRIEF SUMMARY OF THE INVENTION

An exemplary embodiment of an electronic apparatus for providing supply voltage to a first external device with a predetermined pin assignment specification is provided. The electronic apparatus comprises a connection interface and a voltage supplier. The connection interface comprises a first pin and a second pin. The voltage supplier provides a detection voltage signal to the first pin and determines whether to provide the supply voltage according to whether the second pin is at a first level in response to the detection voltage signal. When the second pin is at the first level in response to the detection voltage signal, the voltage supplier provides the supply voltage to the first pin.

According to the electronic apparatus, when the first external device is connected to the electronic apparatus through the connection interface, the second pin is at the first level in response to the detection voltage signal, and the voltage supplier provides the supply voltage to the first external device through the first pin.

An exemplary embodiment of an electronic system comprises an adapter and an electronic apparatus. The adapter comprises a first connection interface. The first connection interface comprises a first pin and a second pin, and there is a conduction path between the first pin and the second pin. The electronic apparatus comprises a second connection interface and a voltage supplier. The second connection interface comprises a third pin and a fourth pin which, respectively, correspond to the first pin and the second pin of the first connection interface. When the first connection interface is connected to the second connection interface, a feedback loop is formed between the third pin and the fourth pin via the conduction path. The voltage supplier provides a detection voltage signal to the third pin. When the first connection interface is connected to the second connection interface, the detection voltage signal enables the fourth pin to be at a first level through the feedback loop, and the voltage supplier provides the supply voltage to the third pin according to the first level.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
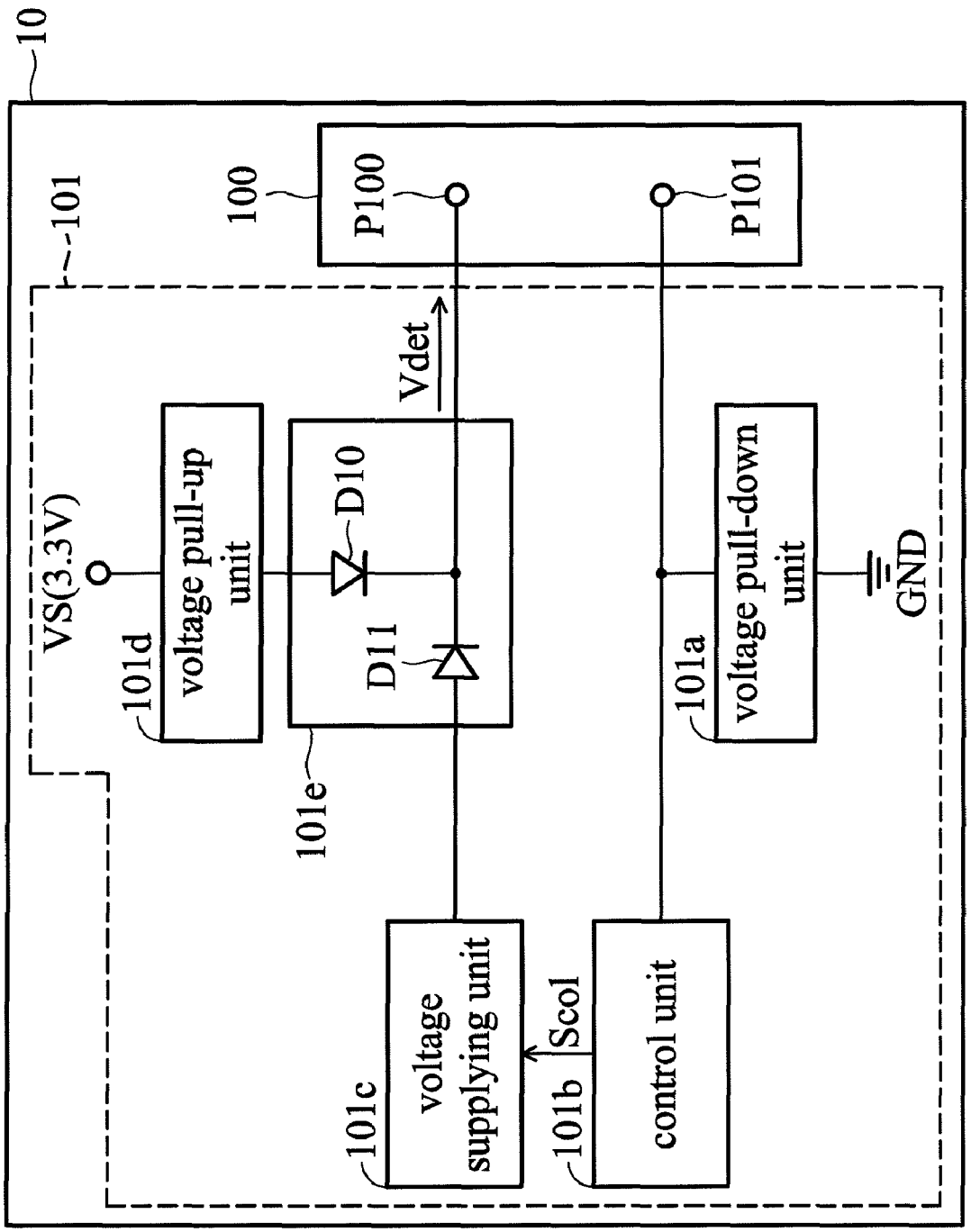
FIG. 1 shows an exemplary embodiment of an electronic apparatus.

The following description is of the best-contemplated mode of carrying out the invention. This description is made for the purpose of illustrating the general principles of the invention and should not be taken in a limiting sense. The scope of the invention is best determined by reference to the appended claims.

Electronic apparatuses are provided. In an exemplary embodiment of an electronic apparatus in FIG. 1, an electronic apparatus 10 comprises a connection interface 100 and a voltage supplier. The connection interface 100 has a plurality of pins, which at least comprises pins P100 and P101. The voltage supplier 101 provides a detection voltage signal Vdet to the pin P100. The voltage supplier 101 determines whether to provide supply voltage according to whether the pin 101 is at a first level in response to the detection voltage signal Vdet. When an external device with a predetermined pin assignment specification is connected to the electrode apparatus 10 through the connection interface 100, the pin P101 is at the first level in response to the detection voltage signal Vdet, and the voltage supplier 101 provides the supply voltage to the external device through the pin P100. When an external device with the predetermined pin assignment specification is not connected to the electrode apparatus 10 through the connection interface 100, the pin P101 is at a second level, and the voltage supplier 101 does not provide the supply voltage. In the situation when an external device with the predetermined pin assignment specification is not connected to the electrode apparatus 10 through the connection interface 100, another external device with the predetermined pin assignment specification can be connected to the electronic apparatus 10 through the connection interface 100. At this time, the pin P101 is also at the second level, and the electronic apparatus 10 does not provide the supply voltage.

In the above embodiment, the electronic apparatus 10 can be a main apparatus, such as a displayer or a projector. An external device with the predetermined pin assignment specification can be a device receiving or transmitting signals, such as a video graphics array (VGA) interface adapter, a digital video interface (DVI) adapter, a high-definition multimedia interface (HDMI) adapter, or an RS232 interface adapter. Thus, according to the type of the external device, the connection interface 100 can be a VGA interface, a DVI, an HDMI, or an RS232 interface.

In the following, the detailed circuit structure of the electronic apparatus 10 will be described, and the operation occurring when an external device with the predetermined pin assignment specification is connected to or not connected to the electronic apparatus 10 will be also described. In the following embodiments, the electronic apparatus 10 is a projector for example, an external device with the predetermined pin assignment specification is a VGA interface adapter for example, and the connection interface 100 is a VGA interface for example.

In the embodiments of the invention, the electronic apparatus 10 and an external device with the predetermined pin assignment specification compose an electronic system.

Figure 2:
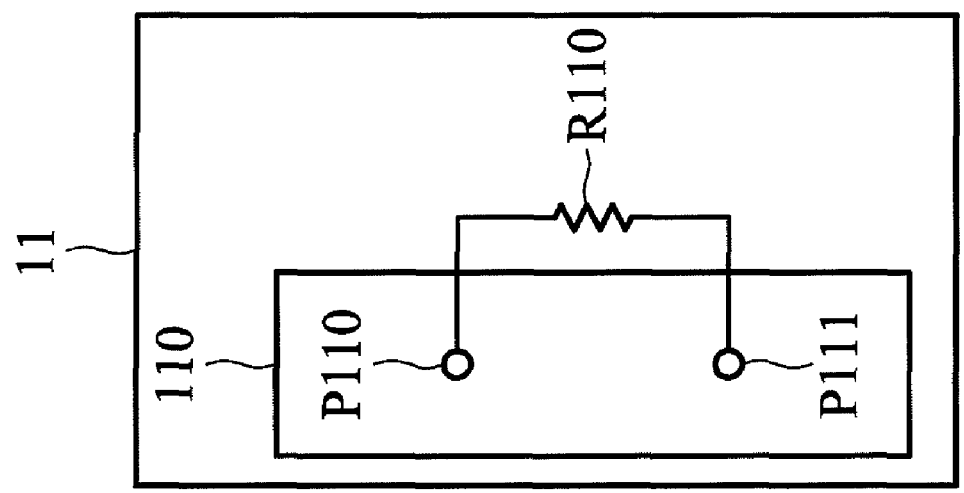
FIG. 2 shows an exemplary embodiment of an external device with a predetermined pin assignment specification.

Referring to FIG. 2, a VGA interface adapter 11 with the predetermined pin assignment specification comprises a connection interface 110. The connection interface 110 has a plurality of pins, which at least comprises pins P110 and P111. In the predetermined pin assignment specification, the pin P110 is defined as a pin receiving the supply voltage, and the pin P111 is defined as a detection pin. In the VGA interface adapter 11 with the predetermined pin assignment specification, a resistor R110 is coupled between the pins P110 and P111, so that there is a conduction path between the pins P110 and P111. The pins P100 and P101 of the connection interface 100 correspond to the pins P110 and P111 of the connection interface 110, respectively. In other words, when the connection interface 110 is inserted into (connected with) the connection interface 100, the pin P100 of the connection interface 100 is connected to the pin P110 of the connection interface 110, and the pin P101 of the connection interface 100 is connected to the pin P111 of the connection interface 110. Thus, when the connection interface 110 is inserted into the connection interface 100, a feedback loop is formed between the pins P100 and P101 through the conduction path of the VGA interface adapter 11.

Referring to FIG. 1, the voltage supplier 101 comprises a voltage pull-down unit 101a, a control unit 101b, a voltage supplying unit 101c, a voltage pull-high unit 101d, and an isolation unit 101e. The voltage pull-down unit 101a is coupled between the pin P101 and a ground terminal GND. The control unit 101b is coupled to the pin P101. The control unit 101b generates a control signal Scol to the voltage supplying unit 101c according to the level of the pin P101. The voltage supplying unit 101c determines whether to provide the supply voltage according to the control Scol. The voltage pull-up unit 101d is coupled between the pin P100 and a voltage source VS and provides the detection voltage signal Vdet P100 according to the voltage source VS. In the embodiment, the voltage source can be a source which provides alternating current (AC) or direct current (DC) voltage after a power plug of the electronic apparatus 10 has been put into a power socket. For example, after the power plug of the electronic apparatus 10 has been put into a power socket, the voltage source VS provides DC voltage with 3.3V. In the embodiment, the DC voltage with 3.3V is referred to as a high-level voltage; thus, the detection voltage signal Vdet provided by the voltage pull-up unit 101d has a high level. The isolation unit 101e is coupled between the pin P110, the voltage supplying unit 101c, and the voltage pull-up unit 101d.

When the VGA interface adapter 11 is not connected to the projector through the connection interfaces 100 and 110, the voltage pull-down unit 101a pulls the level of the pin P101 down to a low level according to the low level of the ground terminal GND. At this time, the control unit 101b de-asserts the control signal Scol according to the low level of the pin P101. In the embodiment, the de-asserted control signal Scol is at a low level. The voltage supplying unit 101c receives the control signal Scol with the low level and does not provide the supply voltage according to the control signal Scol with the low level.

Figure 3:
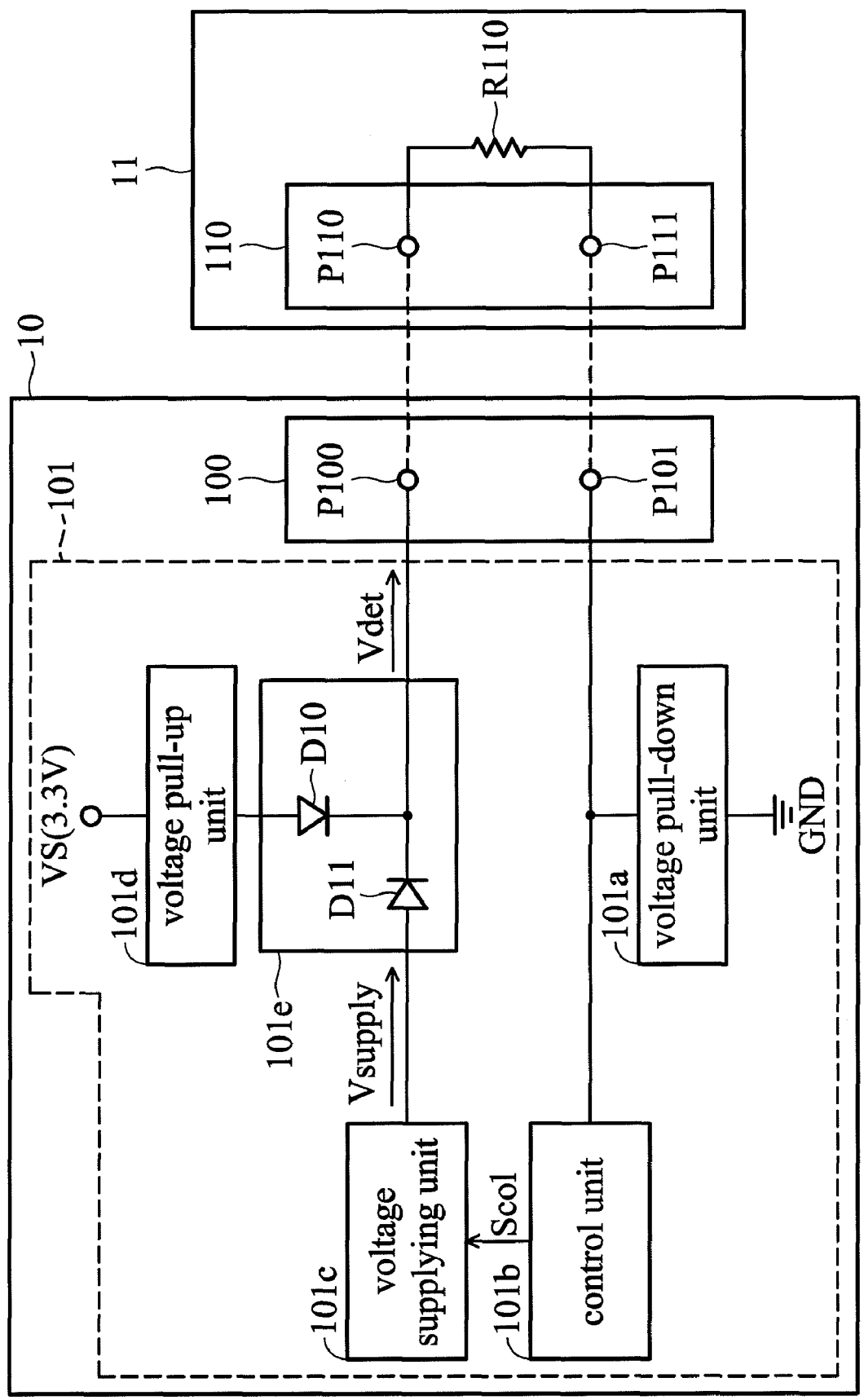
FIG. 3 is a diagram illustrating the external device with a predetermined pin assignment specification in FIG. 2 inserted into the electronic apparatus in FIG. 1.

When the VGA interface adapter 11 is not connected to the projector through the connection interfaces 100 and 110 yet, the voltage supplying unit 101c still does not provide the supply voltage. At this time, the voltage pull-up unit 101d provides the detection voltage signal Vdet to the pin P100 according to the voltage source VS. Referring to FIG. 3, once the VGA interface adapter 11 is connected to the projector through the connection interfaces 100 and 110 (the connection between the connection interfaces 100 and 110 is represented by dotted lines), the detection voltage signal Vdet enables the pin P101 be at a high level through the feedback loop between the pins P100 and P101. At this time, the control unit 101b asserts the control signal Scol according to the high level of the pin P101. In the embodiment, the asserted control signal Scol is at a high level. The voltage supplying unit 101c receives the control signal Scol with the high level and provides supply voltage Vsupply to the pin P100 according to the control signal Scol with the high level. Through the pins P100 and P110 being connected together, the supply voltage Vsupply is transmitted to the VGA interface adapter 11, so that the VGA interface adapter 11 can operate normally. In the embodiment, the supply voltage is 12V.

Referring to FIG. 1, when the VGA interface adapter 11 is removed from (disconnected with) the projector, there is no feedback loop formed between the pins P100 and P101. At this time, the voltage pull-down unit 101a pulls the level of the pin P101 down to the low level. The control unit 101b de-asserts the control signal Scol according to the low of the pin P101. The voltage supplying unit 101c receives the control signal Scol with the low level and does not provide the supply voltage Vsupply according to the control signal Scol with the low level.

According to the above description, when the VGA interface adapter 11 with the predetermined pin assignment specification is inserted into the projector, the pin P101 is at the high level according to the detection voltage signal Vdet through the feedback loop between the pins P100 and P101. Thus, the projector can know whether the VGA interface adapter 11 with the predetermined pin assignment specification is inserted into the projector according to whether the pin P101 is at the high level. When the pin P101 is at the high level, the projector knows that the VGA interface adapter 11 with the predetermined pin assignment specification is inserted into the projector, and the voltage supplier 101 provides the supply voltage Vsupply to the VGA interface adapter 11 through the pins P100 and P110. When the pin P101 is at the low level, the projector knows that the VGA interface adapter 11 with the predetermined pin assignment specification is not inserted into the projector, and the voltage supplier 101 stops providing the supply voltage Vsupply.

According to the embodiment, the projector provides a hot plugging function to the VGA interface adapter 11 with the predetermined pin assignment specification. When the VGA interface adapter 11 is inserted to the projector, the projector provides the supply voltage Vsupply to enable the VGA interface adapter 11 to operate. When the VGA interface adapter 11 is removed from (disconnected with) the projector, the projector stops providing the supply voltage Vsupply.

Figure 4:
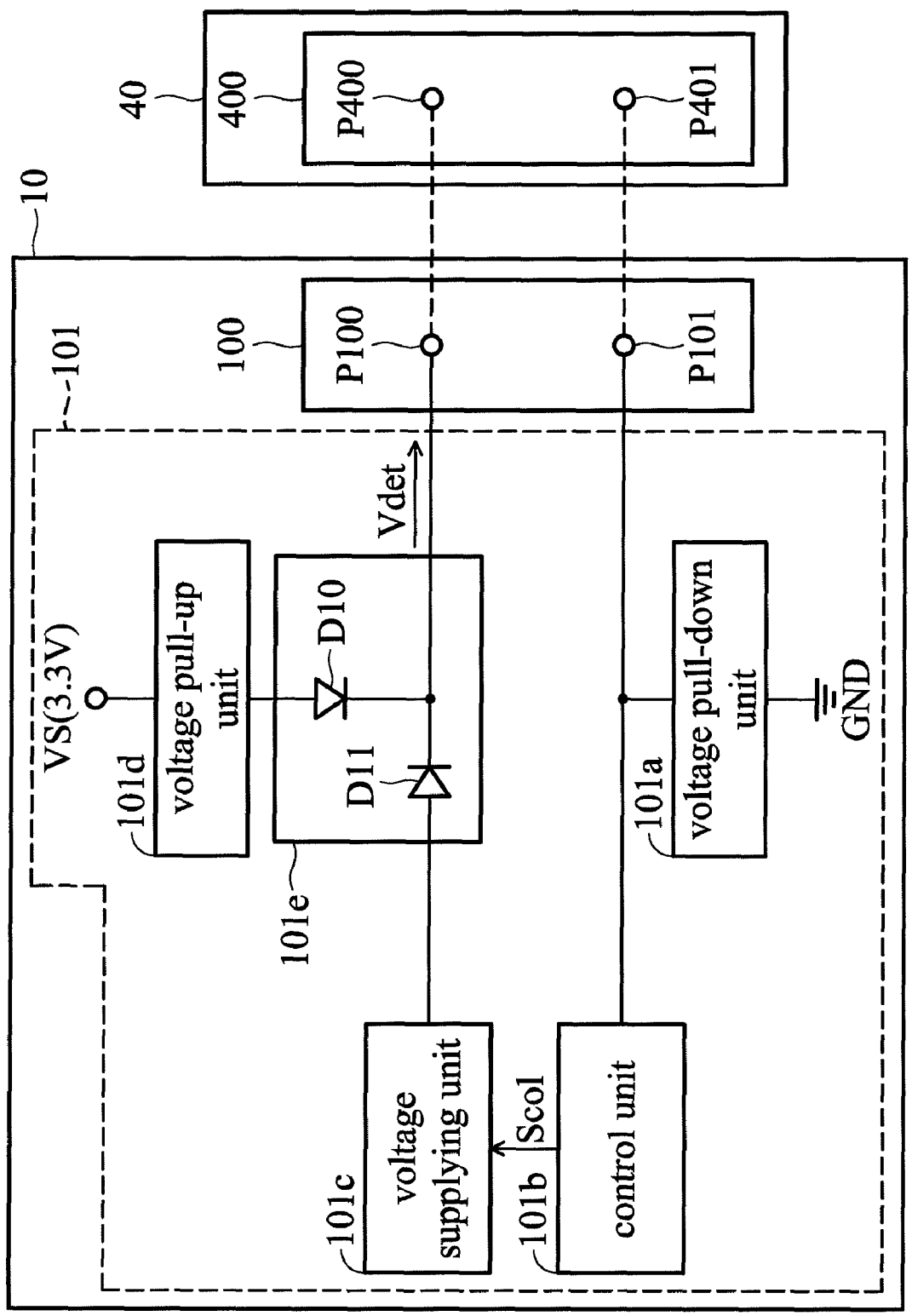
FIG. 4 is a diagram illustrating an external device without predetermined pin assignment specification inserted into the electronic apparatus in FIG. 1.

When the VGA interface adapter 11 with the predetermined pin assignment specification is not connected to the projector, another external device without the predetermined pin assignment specification may be inserted into the projector. In other words, the external device does not comprise two pins between which there is a conduction path: one pin is defined as a pin for receiving supply voltage, and the other pin is defined as a detection pin. As shown in FIG. 4, a connection interface 400 of an external device 40 comprises pins P400 and P401. When the external device 40 is inserted into the projector (the connection between the connection interfaces 100 and 400 is represented by dotted lines), the pin P400 of the connection interface 400 is connected to the pin P100 of the connection interface 100, and the pin P401 of the connection interface 400 is connected to the pin P101 of the connection interface 100. Since there is no conduction path between the pins P400 and P401, there is no feedback loop formed between the pins P100 and P101. At this time, the level of the pin P101 is pulled down to a low level by the voltage pull-down unit 101a. The control unit 101b de-asserts the control signal Scol according to the low level of the pin P101. The voltage supplying unit 101c receives the control signal Scol with the low level and does not provide the supply voltage Vsupply according to the control signal Scol with the low level.

As described above, when the external device 40 without the predetermined pin assignment specification is inserted into the projector through the connection interface 400, the projector does not provide the supply voltage Vsupply to the pin P100. At this time, the pin P100 is pulled up to the level of 3.3V by the voltage pull-up unit 101d, wherein, 3.3V does not cause an exceedingly high voltage impulse to the external device 40.

Referring to FIG. 4, the isolation unit 100e comprises diodes D10 and D11. The diode D10 is coupled between the voltage pull-up and the pin P100. The diode D11 is coupled between the voltage supplying unit 100c and the pin 100. When the external device 40 without the predetermined pin assignment specification is inserted into the projector through the connection interface 400, the external device 40 can not provide voltage, which is larger than 3.3V, to the projector through inverse isolation provided by the diodes D10 and D11, preventing the voltage supplier from being damaged. Thus, the projector has a self-protective mechanism.

Figure 5:
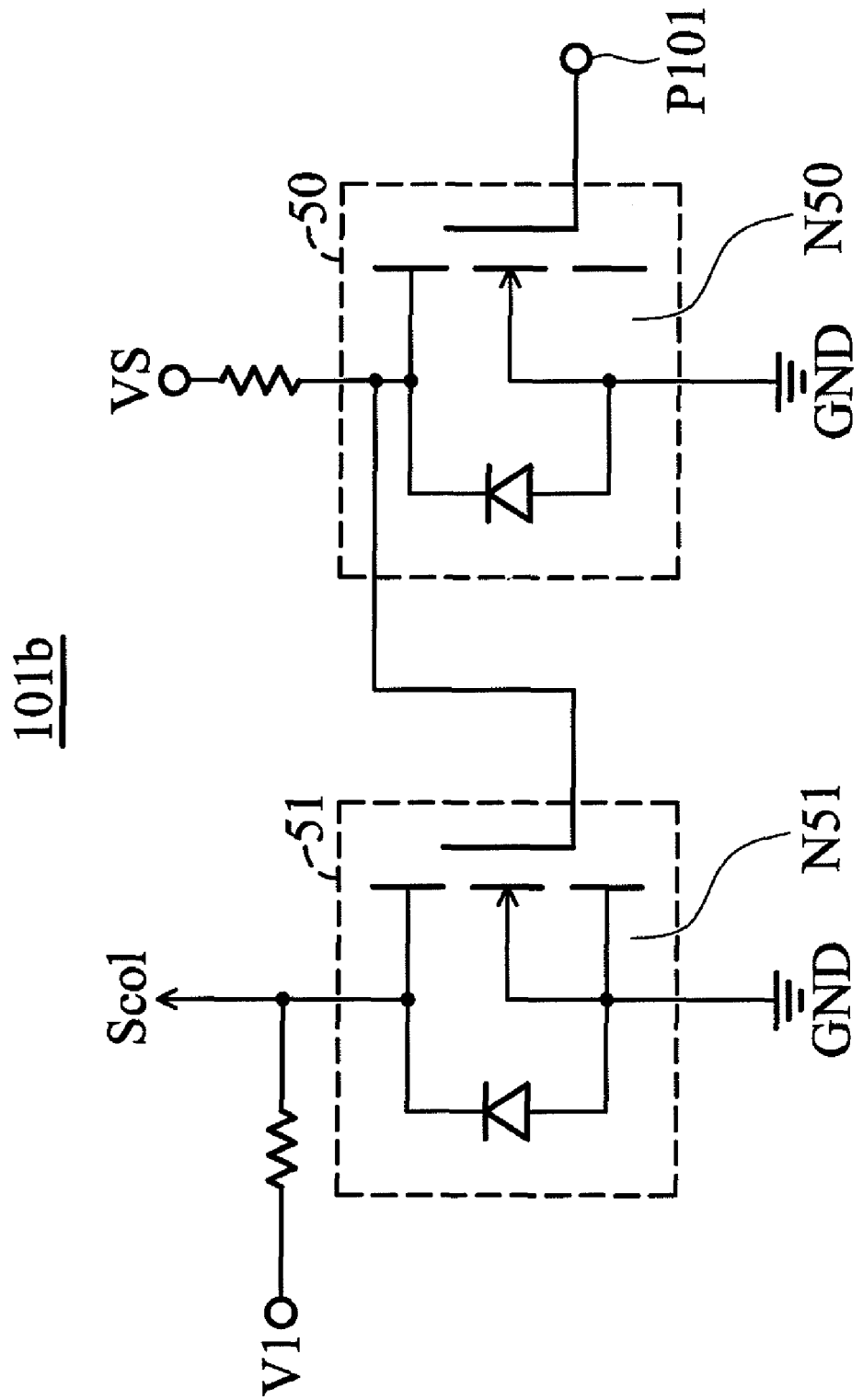
FIG. 5 shows an exemplary embodiment of a control unit.

FIG. 5 shows an exemplary embodiment of the control unit 101b. The control unit 101b comprises two inverter 50 and 51 to invert the level of the pin P101 twice to generate the control signal Scol. Referring to FIG. 5, an input terminal of the first-stage inverter 50 is coupled to the pin P101, and an output terminal thereof is coupled to an input terminal of the second-stage inverter 51. An output terminal of the second-stage inverter 51 generates the control signal Scol. In the embodiment of FIG. 3, the inverter 50 and 51 are implemented by N-type metal-oxide-semiconductor field-effect transistors (MOSFETs) N50 and N51, respectively. In other embodiments, the inverters 50 and 51 can be implemented by logic gates or other types of transistors, such as junction gate field-effect transistors (JFETs).

In the above embodiments, the VGA interface adapter 11 with the predetermined pin assignment specification is given as an example for description. However, according to the scope of the invention, any device which comprises two pins, respectively, corresponding to the pins P100 and P101 and has a conduction path between the two pins can be the external device 11 with the predetermined pin assignment specification. When a device with the predetermined pin assignment specification is inserted to the electronic apparatus 10 through the connection interface 100, the electronic apparatus 10 provides supply voltage to the device to operate.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic apparatus for providing supply voltage to a first external device with a predetermined pin assignment specification, the first external device having a conduction path, comprising:
   a connection interface comprising a first pin and a second pin; and
   a voltage supplier providing a detection voltage signal to the first pin and determining whether to provide the supply voltage according to whether the second pin is at a first level in response to the detection voltage signal;
   wherein, when the first external device is connected to the electronic apparatus through the connection interface, the second pin is at the first level in response to the detection voltage signal through the conduction path, and the voltage supplier provides the supply voltage to the first pin.

2. The electronic apparatus as claimed in claim 1, wherein when the second pin is at a second level, the voltage supplier does not provide the supply voltage.

3. The electronic apparatus as claimed in claim 2, wherein when the first external device is not connected to the electronic apparatus through the connection interface, the second pin is at the second level.

4. The electronic apparatus as claimed in claim 2, wherein when a second external device without the predetermined pin assignment specification is connected to the electronic apparatus through the connection interface, the second pin is at the second level.

5. The electronic apparatus as claimed in claim 1, wherein the voltage supplier comprises:
   a voltage pull-down unit coupled between the second pin and a ground terminal;
   a control unit coupled to the second pin and generating a control signal according to a level of the second pin;
   a voltage supplying unit receiving the control signal and determining whether to provide the supply voltage according to the control signal; and
   a voltage pull-up unit coupled between the first pin and a voltage source and providing the detection voltage signal to the first pin according to the voltage source.

6. The electronic apparatus as claimed in claim 5, wherein when the second pin is at the first level in response to the detection voltage signal, the control unit asserts the control signal, and the voltage supplier provides the supply voltage to the first pin according to the asserted control signal.

7. The electronic apparatus as claimed in claim 5, wherein when the second pin is at a second level, the control unit de-asserts the control signal, and the voltage supplying unit does not provide the supply voltage according to the de-asserted control signal.

8. The electronic apparatus as claimed in claim 7, wherein when the first external device is not connected to the electronic apparatus through the connection interface, the second pin is at the second level.

9. The electronic apparatus as claimed in claim 7, wherein when a second external device without the predetermined pin assignment specification is connected to the electronic apparatus through the connection interface, the second pin is at the second level.

10. The electronic apparatus as claimed in claim 9, wherein the voltage supplier further comprises an isolation unit coupled to the first pin and preventing the second external device from providing voltage to the electronic apparatus through the first pin.

11. The electronic apparatus as claimed in claim 10, wherein the isolation unit comprises:
a first diode coupled between the voltage pull-up unit and the first pin; and
a second diode coupled between the voltage supplying unit and the first pin.

12. The electronic apparatus as claimed in claim 5, wherein the control unit comprises two inverters to invert the level of the second pin twice to generate the control signal.

13. The electronic apparatus as claimed in claim 1, wherein the connection interface is a video graphics array (VGA) interface, a digital video interface (DVI), a high-definition multimedia interface (HDMI), or an RS232 interface.

14. An electronic system comprising:
an adapter comprising a first connection interface, wherein the first connection interface comprises a first pin and a second pin, and there is a conduction path between the first pin and the second pin; and
an electronic apparatus comprising:
a second connection interface comprising a third pin and a fourth pin which, respectively, correspond to the first pin and the second pin of the first connection interface, wherein when the first connection interface is connected to the second connection interface, a feedback loop is formed between the third pin and the fourth pin through the conduction path; and
a voltage supplier providing a detection voltage signal to the third pin;
wherein when the first connection interface is connected to the second connection interface, the detection voltage signal enables the fourth pin to be at a first level via the feedback loop, and the voltage supplier provides a supply voltage to the third pin according to the first level.

15. The electronic system as claimed in claim 14, wherein when the first connection interface is not connected to the second connection interface, the fourth pin is at a second level, and the voltage supplier does not provide the supply voltage according to the second level.

16. The electronic system as claimed in claim 14, wherein the voltage supplier comprises:
a voltage pull-down unit coupled between the fourth pin and a ground terminal;
a control unit coupled to the fourth pin and generating a control signal according to a level of the fourth pin;
a voltage supplying unit receiving the control signal and determining whether to provide the supply voltage according to the control signal; and
a voltage pull-up unit coupled between the third pin and a voltage source and providing the detection voltage signal to the third pin according to the voltage source.

17. The electronic system as claimed in claim 16, wherein when the fourth pin is at the first level, the control unit asserts the control signal, and the voltage supplying unit provides the supply voltage to the third pin according to the asserted control signal.

18. The electronic apparatus as claimed in claim 16, wherein when the first connection interface is not connected to the second connection interface, the fourth pin is at a second level, the control unit de-asserts the control signal, and the voltage supplying unit does not provide the supply voltage according to the de-asserted control signal.

19. The electronic system as claimed in claim 16, wherein the voltage supplier further comprises an isolation unit coupled to the third pin and preventing external voltage from being provided to the electronic apparatus through the third pin when the first connection interface is not connected to the second connection interface.

20. The electronic system as claimed in claim 19, wherein the isolation unit comprises:
a first diode coupled between the voltage pull-up unit and the third pin; and
a second diode coupled between the voltage supplying unit and the third pin.

21. The electronic system as claimed in claim 16, wherein the control unit comprises two inverters to invert the level of the fourth pin twice to generate the control signal.

22. The electronic system as claimed in claim 14, wherein the adapter is a video graphics array (VGA) interface adapter, a digital video interface (DVI) adapter, a high-definition multimedia interface (HDMI) adapter, or an RS232 interface adapter.

* * * * *